United States Patent
Seibring et al.

(10) Patent No.: US 7,897,077 B2
(45) Date of Patent: Mar. 1, 2011

(54) PROCESS FOR PELLETIZING POLYMER MELTS COMPRISING LOW-BOILING SUBSTANCES

(75) Inventors: Joachim Seibring, Freinsheim (DE); Jens Becker, Eisenberg (DE); Michael Kopietz, Grünstadt (DE); Theodor Bruckmann, Greven-Gimpte (DE)

(73) Assignee: BASF SE, Ludwigshafen (DE)

( * ) Notice: Subject to any disclaimer, the term of this patent is extended or adjusted under 35 U.S.C. 154(b) by 176 days.

(21) Appl. No.: 12/293,939

(22) PCT Filed: Mar. 21, 2007

(86) PCT No.: PCT/EP2007/052681
§ 371 (c)(1),
(2), (4) Date: Sep. 22, 2008

(87) PCT Pub. No.: WO2007/107584
PCT Pub. Date: Sep. 27, 2007

(65) Prior Publication Data
US 2009/0051061 A1 Feb. 26, 2009

(30) Foreign Application Priority Data
Mar. 22, 2006 (EP) .................... 06111527

(51) Int. Cl.
*B29B 9/06* (2006.01)
(52) U.S. Cl. .......................... 264/85; 264/142
(58) Field of Classification Search .............. 264/5, 11, 264/13, 14, 85, 140, 141, 142, 143
See application file for complete search history.

(56) References Cited

U.S. PATENT DOCUMENTS

| | | | |
|---|---|---|---|
| 3,874,835 A | 4/1975 | Rossiter et al. | |
| 4,759,889 A * | 7/1988 | Voss | 264/40.1 |
| 4,894,191 A * | 1/1990 | Tatzel et al. | 264/142 |
| 5,143,673 A * | 9/1992 | Grimminger | 264/142 |
| 5,611,962 A * | 3/1997 | Garcia et al. | 524/320 |
| 6,232,436 B1 | 5/2001 | Beck et al. | |
| 2002/0074680 A1* | 6/2002 | Maletzko et al. | 264/51 |
| 2004/0094858 A1* | 5/2004 | Kim | 264/51 |
| 2008/0296794 A1* | 12/2008 | Lin et al. | 264/41 |

FOREIGN PATENT DOCUMENTS

| | | |
|---|---|---|
| DE | 1915950 | 12/1969 |
| DE | 2215841 | 10/1972 |
| DE | 2455757 | 6/1976 |
| DE | 43 21 683 | 1/1995 |
| DE | 10209149 | 9/2003 |
| EP | 0129195 | 12/1984 |
| EP | 0129196 | 12/1984 |
| EP | 0305862 | 3/1989 |
| WO | WO-0119580 | 3/2001 |
| WO | WO-2004091896 | 10/2004 |

* cited by examiner

*Primary Examiner* — Joseph S Del Sole
*Assistant Examiner* — Ryan Ochylski
(74) *Attorney, Agent, or Firm* — Connolly Bove Lodge & Hutz LLP

(57) ABSTRACT

The invention relates to a process for pelletizing polymer melts, at above ambient pressure, in a pelletizing chamber into which a cutting apparatus has been inserted. In a first step, the pelletizing chamber is flooded with a gas which is inert toward the polymer melt and whose pressure is that at which the pelletizing process is carried out. The polymer melt is then injected into the pelletizing chamber. Finally, the gas is displaced from the pelletizing chamber via a liquid as soon as the polymer melt begins to flow through the cutting apparatus, this melt being cut into pellets.

8 Claims, 2 Drawing Sheets

PROCESS FOR PELLETIZING POLYMER MELTS COMPRISING LOW-BOILING SUBSTANCES

This application is a national phase of PCT/EP2007/052681, filed on Mar. 21, 2007 which claims priority to EP 06111527.5 filed Mar. 22, 2006, the entire contents of all are hereby incorporated by reference.

The invention relates to a process for pelletizing polymer melts, at above ambient pressure, in a pelletizing chamber into which a cutting apparatus has been inserted.

BACKGROUND OF THE INVENTION

During continuous pelletizing operations, a liquid at increased pressure generally flows through the pelletizing chamber. The liquid flowing through the chamber is generally water. The pelletizing process is therefore also termed underwater pelletizing.

By way of example, the underwater pelletizing process is used when pellets are produced from plastics which can still comprise residual monomer, water, or other low-boiling substances through the production process. This can lead to foaming of the plastic during pelletization at ambient pressure. By virtue of the increased pressure in the pelletizing chamber, expansion of the plastic during the pelletizing process is prevented.

A process for production of expandable plastics pellets is described by way of example in EP-A 0 305 862. In that process, a polymer base material or a polymer mixture is fed to an extruder and melted in the extruder. The extruder has an injector for addition of a blowing agent to the melt. This blowing agent is added under pressure. The melt, with the blowing agent dissolved therein, is pelletized in a pelletizing chamber through which water flows. The pellets are entrained by the stream of water and introduced into a dryer in which the pellets are dried. Examples of polymer compositions mentioned as suitable are aromatic alkenyl polymers or copolymers, e.g. polystyrene, styrene-maleic anhydride copolymer, polycarbonate, polyester, polyetherimide, polysulfone, and polyphenyl ether.

From polyamide preparation, it is known that water arising during the poly-condensation of dicarboxylic acid with diamine dissolves in the polyamide. This water leads to foaming of the polyamide during pelletization without devolatilization. Large undesired bubbles can also arise in the pellets. The current method of devolatilization uses a vented extruder which necessitates high capital expenditure and high maintenance costs, or a separator, which rapidly suffers from encrusting and then has to be cleaned out.

SUMMARY OF THE INVENTION

It is an object of the invention to provide a process in which the abovementioned prior-art disadvantages are eliminated.

The object is achieved via a process for pelletizing polymer melts, at above ambient pressure, in a pelletizing chamber into which a cutting apparatus has been inserted, which comprises the following steps:
(a) flooding the pelletizing chamber with a gas which is inert toward the polymer melt and whose pressure is that at which the pelletizing process is carried out,
(b) injecting the polymer melt into the pelletizing chamber,
(c) displacing the gas from the pelletizing chamber via a liquid as soon as the polymer melt begins to flow through the cutting apparatus, this melt being cut into pellets.

The flooding of the pelletizing chamber with a gas which is inert toward the polymer melt and whose pressure is that at which the pelletizing process is carried out prevents the polymer melt from expanding on start-up of the production process in the pelletizing chamber.

There is generally a rapidly rotating knife inserted into the pelletizing chamber and bearing upon a cutting plate. The polymer melt is pressed through separate apertures in the cutting plate. It is thus cut into pellets.

The polymer melt is preferably injected continuously into the pelletizing chamber. A melt pump with die head is generally used for this purpose.

There are generally a plurality of orifices inserted into the die head, and the polymer melt is injected through these into the pelletizing chamber. In one preferred embodiment, the L/D ratio of the orifices is from 50 to 90, preferably from 60 to 85, particularly preferably from 70 to 80.

Since the length of the die orifices is relatively great in comparison with that of the die orifices in die heads known from the prior art, there is likewise a reduction in the foaming of the polymer melt in the pelletizing chamber. In one particularly preferred embodiment, the die head is constructed from individual similar modules, which are respectively connected to one another. This permits simple matching of the length of the die orifices to the appropriate polymer melt processed by the die head. For example, addition of modules lengthens the die orifices, whereas removal of modules can shorten them.

As soon as the polymer melt begins to flow through the cutting apparatus to be cut into pellets, the gas is displaced from the pelletizing chamber via a liquid. This liquid is preferably at only slightly higher pressure than the gas. Flooding of the pelletizing chamber prior to the start of the pelletizing process is not possible, because that causes liquid under pressure to penetrate into the die head and thus harden the polymer melt present in the die head. This would damage the die head and the knife.

The pressure of the liquid in the pelletizing chamber is generally in the range from 1 to 50 bar, preferably in the range from 1.5 to 30 bar, and in particular in the range from 2 to 10 bar. The temperature of the liquid which flows through the pelletizing chamber is preferably in the range from 5 to 90° C., with preference in the range from 10 to 60° C.; the maximum temperature of the liquid here depends on the polymer to be pelletized.

The flooding of the pelletizing chamber is necessary in order to permit sufficient heat to be dissipated from the pellets, so that they rapidly solidify. Until the pellets have solidified, the individual pellets can easily fuse together and agglomerate to give larger clumps. An advantage of liquids when compared with gas for cooling is that the thermal capacity and thermal conductivity of liquids are generally higher than those of gases. The polymer melt can therefore dissipate heat more rapidly to a liquid environment than to a gaseous environment, and can therefore cool more rapidly.

After the cutting process, the pellets continue to cool in the liquid. In one preferred embodiment, in order to ensure continuous operation, the pellets are then discharged with the stream of liquid from the pelletizing chamber.

The inert gas with which the pelletizing chamber is flooded at the start of the process is preferably nitrogen, air, or a noble gas. However, any other gas known to the person skilled in the art and inert toward the polymer melt is suitable.

The liquid which displaces the gas from the pelletizing chamber is preferably water. However, any other liquid known to the person skilled in the art and unreactive toward the polymer melt is also suitable instead of water.

In one preferred embodiment, the pellets produced in the pelletizing process and discharged with the liquid from the pelletizing chamber are then isolated from the liquid.

The inventive process is preferably used for pelletizing polymers which can still comprise very small amounts of monomers, or water, or of other low-boiling substances, and which can therefore expand during pelletization. To prevent foaming of the polymer during the pelletizing process, the pelletizing process takes place under pressure. The volatile constituents present here are enclosed under pressure within the polymer. No foaming takes place and no bubbles are produced.

The inventive process is particularly suitable for production of pellets from polymer melts which still comprise low-boiling substances. The inventive process is preferably used for production of polyamides.

Preferred polyamides are formed via reactions of aqueous solutions of salts derived from α,ω-alkanedicarboxylic acids having from 6 to 12 carbon atoms and α,ω-alkanediamines having from 6 to 12 carbon atoms, in particular from those having a straight carbon chain. Examples of suitable dicarboxylic acids are azelaic acid, adipic acid, suberic acid, sebacic acid, or decanedicarboxylic acid, terephthalic acid, or naphthalenedicarboxylic acid. Preferred α,ω-alkanedicarboxylic acids have from 6 to 10 carbon atoms.

Examples of suitable diamines are hexamethylenediamine, octamethylenediamine, or decamethylenediamine, bis(4-aminocyclohexyl)-methane, bis(4-amino-3-methylcyclohexyl)methane, bis(4-aminocyclohexyl)-2,2-propane. Preferred α,ω-alkanediamines have from 6 to 10 carbon atoms.

It is also possible to make concomitant use of lactams, in particular caprolactam, for production of copolyamides.

Other suitable polyamides are those produced from a mixture composed of at least one lactam and water and also, if appropriate, other monomer units and/or conventional additives and fillers, under polyamide-forming conditions. Production of these polyamides is known by way of example from DE-A 43 21 683.

Examples of a suitable lactam are caprolactam, oenantholactam, caprylolactam, and laurolactam, or else a mixture of these, caprolactam being preferred.

Other monomer units which can be used are by way of example dicarboxylic acids, such as alkanedicarboxylic acids having from 6 to 12 carbon atoms, in particular from 6 to 10 carbon atoms, e.g. adipic acid, pimelic acid, suberic acid, azelaic acid, or sebacic acid, or else terephthalic acid or isophthalic acid, diamines, such as $C_4$-$C_{12}$-alkyldiamines, in particular having from 4 to 8 carbon atoms, e.g. hexamethylenediamine, tetramethylenediamine, or octamethylenediamine, or else m-xylylenediaryine, bis(4-aminophenyl)methane, bis(4-aminophenyl)- 2,2-propane, or bis(4-aminocyclohexyl)methane, or else a mixture of dicarboxylic acids and diamines, each in any desired combination, but advantageously in equivalent amounts, e.g. hexamethylenediammonium adipate, hexamethylenediammonium terephthalate, or tetramethylenediammonium adipate, preferably hexamethylenediammonium adipate and hexamethylenediammonium terephthalate, in amounts in the range from 0 to 60% by weight, preferably from 10 to 50% by weight, based on the entire amount of monomers. Particular industrial importance has been achieved by polycaprolactam and polyamides composed of caprolactam, hexamethylenediamine, and also adipic acid, isophthalic acid, and/or terephthalic acid.

In one embodiment, caprolactam and hexamethylenediammonium adipate ("AH salt") are used, the AH salt being used in the form of an aqueous solution. The molar ratio of caprolactam to AH salt is usually in the range from 0.05:99.95 to 20:80, preferably from 5:95 to 15:85.

Conventional additives and fillers that can be used are pigments, such as titanium dioxide, silicon dioxide, or talc, chain regulators, such as aliphatic and aromatic carboxylic acids and aliphatic and aromatic dicarboxylic acids, e.g. propionic acid or terephthalic acid, stabilizers, such as cuprous halides and alkali metal halides, nucleating agents, such as magnesium silicate or boron nitride, catalysts, such as phosphorous acid, and also antioxidants, in amounts in the range from 0 to 5% by weight, preferably from 0.05 to 1% by weight, based on the total amount of monomers. The additives are generally added prior to the pelletizing process and prior to, during, or after, preferably after, the polymerizing process.

According to the invention, suitable polyamides generally have a viscosity number of from 30 to 120 ml/g, preferably from 50 to 90 ml/g, determined in 0.5% strength by weight solution in 96% strength by weight sulfuric acid at 25° C. to ISO 307.

Examples of polyamides which can be pelletized via the inventive process are (the monomers being stated in brackets):

PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA MXD6 (m-xylylenediamine, adipic acid)
PA TMDT (trimethylhexamethylenediamine, terephthalic acid)

Preferred polyamides are polyhexamethyleneadipamide (PA 66) and polyhexamethylenesebacamide (PA 610), and also nylon-6/6,6 copolyamides, in particular with from 5 to 50% by weight content of caprolactam units. Particular preference is given to PA 66 and to nylon-6/6,6 copolyamides.

Other suitable materials are semiaromatic copolyamides, such as PA 6/6T and PA 66/6T, where the triamine content of these is less than 0.5% by weight, preferably less than 0.3% by weight. Production of the semiaromatic copolyamides with low triamine content can follow the processes described by way of example in EP-A 129 195 and EP-A 129 196.

Details concerning the production of the individual polyamides can be found by the person skilled in the art by way of example in Ullmann's Enzyklopädie der technischen Chemie [Ullmann's Encyclopedia of Industrial Chemistry], 4th edition, volume 19, pages 39-54, Verlag Chemie, Weinheim 1980, and also Ullmann's Encyclopedia of Industrial Chemistry, Vol. A 21, pages 179-206, VCH Verlag, Weinheim 1992, and also Stoeckhert, Kunststofflexikon [Plastics encyclopedia], 8th edition, pages 425-428, Hansa Verlag Munich 1992 (keyword "Polyamide" [Polyamides] et seq.).

For the purposes of the present invention, examples of polymers comprising blowing agent are styrene (co)polymers comprising blowing agent, polycarbonate comprising blowing agent, and polyamide comprising blowing agent, particular preference being given to styrene (co)polymers comprising blowing agent, and also polymers which can still comprise components that can be lost by evaporation, examples being solvents or water from the production process.

Preferred styrene (co)polymers are glass-clear polystyrene (GPPS), impact-modified polystyrene (HIPS), anionically polymerized polystyrene or anionically polymerized impact-modified polystyrene (AIPS), styrene-α-methylstyrene copolymers, acrylonitrile-butadiene-styrene copolymers (ABS), styrene-acrylonitrile (SAN), acrylonitrile-styrene-acrylate (ASA), methacrylate-butadiene-styrene (MBS), methyl methacrylate-acrylonitrile-butadiene-styrene (MABS) copolymers, or a mixture thereof. Polyphenylene ether (PPE) can also be admixed with the styrene (co)polymers mentioned.

In order to improve mechanical properties or heat resistance, the styrene (co)polymers mentioned can be blended with thermoplastic polymers, such as polyamides (PA), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones, or polyether sulfides (PES), or a mixture thereof, generally in proportions of up to at most 30% by weight in total, preferably in the range from 1 to 10% by weight, based on the polymer melt, if appropriate with use of compatibilizers. Within the quantitative ranges mentioned, other mixtures are also possible with, for example, hydrophobically modified or functionalized polymers, or with oligomers, with rubbers, such as polyacrylates or polydienes, e.g. styrene-butadiene block copolymers, or with biodegradable aliphatic or aliphatic/aromatic copolyesters.

It is also possible to admix recycled polymer materials from the thermoplastic polymers mentioned, in particular styrene (co)polymers and styrene (co)polymers comprising blowing agent (EPS) with the styrene (co)polymer melt, where the amounts admixed, generally at most 30% by weight, in particular from 1 to 10% by weight, do not substantially impair the properties of the materials.

The styrene (co)polymer melt comprising blowing agent generally comprises one or more blowing agents homogeneously dispersed in a total proportion of from 2 to 10% by weight, based on the styrene (co)polymer melt comprising blowing agent. Suitable blowing agents are the physical blowing agents usually used in EPS, examples being aliphatic hydrocarbons having from 2 to 7 carbon atoms, alcohols, ketones, ethers, or halogenated hydrocarbons. Preference is given to use of isobutane, n-butane, isopentane, or n-pentane.

The styrene (co)polymer melt can moreover receive additions of additives, nucleating agents, plasticizers, active ingredients, e.g. fungicides, pesticides, herbicides, soluble or insoluble inorganic and/or organic dyes and pigments, e.g. IR absorbers, such as carbon black, graphite, or aluminum powder, or else fillers such as chalk, talc, added together or with spatial separation. The amounts generally added of the additives are in the range from 0.01 to 30% by weight, preferably in the range from 1 to 10% by weight. For homogeneous microdispersion of the additives in the styrene (co)polymer, it can be advantageous, especially in the case of polar additives, to use a dispersing agent, e.g. organosilanes or maleic-anhydride-grafted styrene polymers. Preferred plasticizers are mineral oils, oligomeric styrene polymers, and phthalates in amounts of from 0.05 to 10% by weight, based on the styrene (co)polymer.

The relatively-high-molecular-weight styrene (co)polymers permit use of a temperature in the range from 140 to 300° C., preferably in the range from 160 to 240° C., to convey the styrene (co)polymer melt comprising blowing agent through the die plate. There is no need for cooling to the glass transition temperature region.

BRIEF DESCRIPTION OF THE DRAWINGS

The invention is described in more detail below, using a drawing, in which.

DETAILED DESCRIPTION OF THE DRAWINGS

Figure 1:
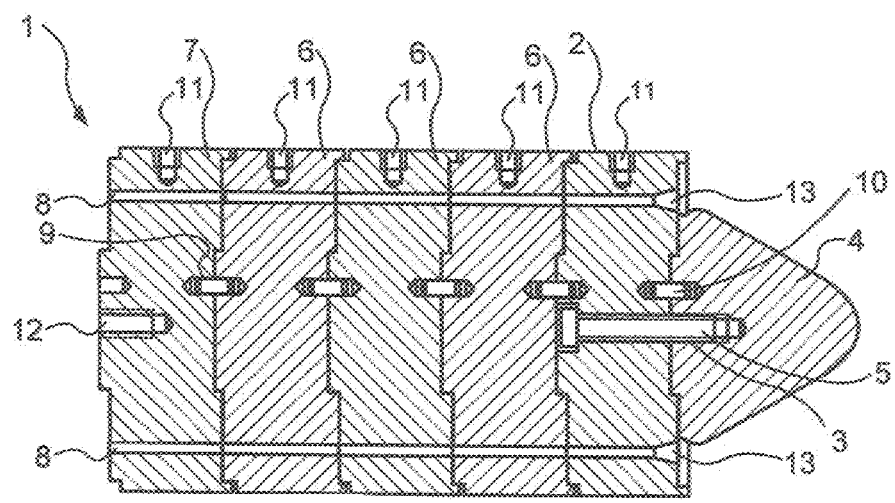
FIG. 1 shows a die head designed according to the invention.

FIG. 1 shows a die head 1 designed according to the invention, in which a die point 4 has been secured to an entry module 2, which has a central hole 3. To this end, a screw device 5 which has been passed through the central hole 3 has been used to connect the die point 4 to the entry module 2. However, instead of the screw device 5 which has been passed through the central hole 3, it is also possible to use a plurality of screw devices to secure the die point 4 on the entry module 2. It is also possible to use any other securing method known to the person skilled in the art. By way of example, the die point 4 can also have been welded to the entry module 2, or the entry module 2 can have been designed in one piece with the die point 4. By way of example, it would also be possible to provide a hole with a screw thread in the entry module 2, and to design the die point likewise with a screw thread, so that the die point 4 can be screwed directly onto the entry module 2.

On that side of the entry module 2 opposite to the die point 4, a first intermediate module 6 has been secured. Further intermediate modules 6 are attached to this first intermediate module 6. The final unit is an exit module 7, connected to the final intermediate module 6.

Axially running die orifices 8 have been designed in the entry module 2, in the intermediate modules 6, and in the exit module 7. The amount of polymer melt which flows through the die head 1 and is pelletized is determined via the number of die orifices 8. The die orifices 8 here have been designed at an axially identical position in the entry module 2, in the intermediate modules 6, and in the exit module 7, and therefore when the modules 2, 6 and 7 are connected continuous die orifices 8 are always produced. To make assembly of the modules 2, 6 and 7 easier, holes 9 have been designed in each of these and centering pins 10 have been inserted into these holes.

By way of example, tensioning screw devices can be used to connect entry module 2, intermediate modules 6 and exit module 7. The embodiment shown here has blind holes 11 on the outer periphery of the modules 2, 6, and 7, and a screw thread has been designed in each of these holes. To connect the modules 2, 6, and 7, a flat steel plate not shown in FIG. 1 is placed on the blind holes 11 and has holes at the positions corresponding to the locations of the blind holes 11. Screw devices are passed through the holes in the flat steel plate and are screw-fastened in the blind holes 11.

A hole 12 with a screw thread has been designed in the exit module 7, and a cutting apparatus can by way of example be secured in this hole. The polymer melt which emerges from the die orifices 8 is cut into pellets with the aid of the cutting apparatus. The cutting apparatus here is preferably a rapidly rotating knife.

To produce polymer pellets, the polymer melt is conveyed by means of a melt pump or of an extruder in the direction of the entry module 2. The die point 4 ensures that no melt accumulates in the central region of the entry module 2, but that all of the melt is transported to the die orifices 8. The entry apertures of the die orifices 8 have been designed with conically widened regions 13, thus also eliminating any dead zones between the individual die orifices. The melt is conducted via the conically widened regions 13 into the die orifices 8. The polymer melt then flows through the die orifices 8 and emerges from the die orifices 8 at the exit module 7. Here, the individual melt filaments emerging from the die orifices 8 are cut into pellets. According to the invention, the polymer melt is cut into pellets in a pelletizing chamber into which the die head 1 opens. A liquid flows through this pelletizing chamber. The pellets cool in the liquid, thus avoiding any coalescence of individual pellets to give agglomerate. At the same time, the liquid is subject to an elevated pressure, thus avoiding any expansion of the polymer melt, which can still comprise blowing agent or residues of low-boiling substances.

Figure 2:
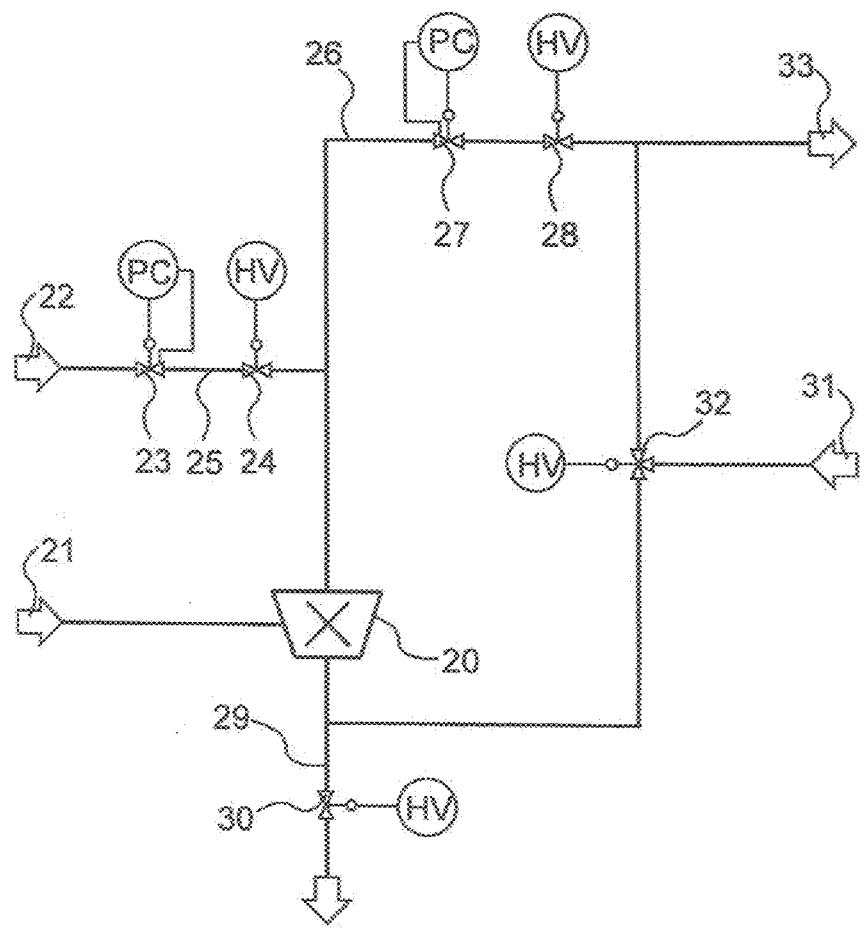
FIG. 2 shows a flow diagram for the inventive process.

FIG. 2 shows a flow diagram of the inventive process.

In the inventive process, polymer melt 21 is introduced into a pelletizing chamber 20. The introduction of the polymer melt 21 here preferably takes place by way of a die head as shown in FIG. 1. For start-up of the granulating process, the granulating chamber 20 has been flooded with an inert gas under pressure. The inert gas is introduced into the process by way of an inert gas supply 22. The pressure of the inert gas is adjusted by way of a pressure control valve 23. An inert gas supply line 25 has been connected by way of a gas valve 24 to a circulation line 26. A second pressure control valve 27 has been inserted into the circulation line 26. The pressure in the circulation line 26 is adjusted by way of the pressure control valve 27. Downstream of the second pressure control valve 27 there is a shut-off valve 28. For start-up of the pelletizing process, the shut-off valve 28 has been closed and the gas valve 24 opened. A gas under pressure can therefore flow into the circulation line 26. The pelletizing chamber 20 and the circulation line 26 are thus flooded with an inert gas under pressure. A discharge line 29 branches off the circulation line 26 and can be closed by a second shut-off valve 30. During the operation of the pelletizing process, the second shut-off valve 30 has been closed. As soon as the pelletizing process has been started, liquid under the same pressure as the inert gas is passed into the circulation line 26 by way of a liquid supply 31 which has been connected to the circulation line 26 by way of a T valve 32. At the same time, the gas valve 24 is closed so that no more gas passes into the process. The liquid under pressure displaces the gas from the circulation line 26 and from the pelletizing chamber 20. The pressure in the circulation line 26 is kept constant via the second pressure control valve 27. The shut-off valve 28 is opened, so that the liquid which comprises the pellets produced in the pelletizing chamber 20 is removed from the circulation line 26 by way of a liquid discharge 33. The pellets are then isolated from the liquid.

Preferred inert gas used for start-up of the process is air or nitrogen. Water is preferably used as liquid for continuous operation of the pelletizing process.

Key

1 Die head
2 Entry module
3 Central hole
4 Die point
5 Screw device
6 Intermediate module
7 Exit module
8 Die orifice
9 Hole
10 Centering pin
11 Blind hole
12 Hole with screw thread
13 Conical widening
20 Pelletizing chamber
21 Polymer melt
22 Inert gas supply
23 Pressure control valve
24 Gas valve
25 Inert gas supply line
26 Circulation line
27 Second pressure control valve
28 Shut-off valve
29 Discharge line
30 Second shutoff valve
31 Liquid supply
32 T valve
33 Liquid discharge

The invention claimed is:

1. Process of pelletizing polymer melts, at above ambient pressure, in a pelletizing chamber into which a cutting apparatus has been inserted, which comprises the following steps:
   (a) flooding the pelletizing chamber with a gas, which is inert toward the polymer melt and whose pressure is that at which the pelletizing process is carried out, on start-up of the pelletizing process,
   (b) injecting a polymer melt into the pelletizing chamber,
   (c) displacing the gas from the pelletizing chamber via a liquid as soon as the pelletizing process has been started and the polymer melt begins to flow through the cutting apparatus, the polymer melt being cut into pellets, such that no foaming takes place.

2. The process according to claim 1, wherein the gas is nitrogen or air.

3. The process according to claim 1, wherein, after the displacement of the gas via the liquid, polymer melt continues to be injected into the pelletizing chamber, the polymer melt is cut in the cutting apparatus to give pellets, and the pellets produced in the pelletizing process are discharged with the liquid from the pelletizing chamber, and are then isolated from the liquid.

4. The process according to claim 1, wherein the pressure in the pelletizing chamber is in the range from 2 to 15 bar.

5. The process according to claim 2, wherein, after the displacement of the gas via the liquid, polymer melt continues to be injected into the pelletizing chamber, the polymer melt is cut in the cutting apparatus to give pellets, and the pellets produced in the pelletizing process are discharged with the liquid from the pelletizing chamber, and are then isolated from the liquid.

6. The process according to claim 2, wherein the pressure in the pelletizing chamber is in the range from 2 to 15 bar.

7. The process according to claim 3, wherein the pressure in the pelletizing chamber is in the range from 2 to 15 bar.

8. The process according to claim 5, wherein the pressure in the pelletizing chamber is in the range from 2 to 15 bar.

* * * * *